United States Patent
Bicerano

(10) Patent No.: US 9,006,314 B2
(45) Date of Patent: Apr. 14, 2015

(54) THERMOSET PARTICLES WITH ENHANCED CROSSLINKING, PRODUCTION, AND THEIR USE IN OIL AND NATURAL GAS DRILLING APPLICATIONS

(71) Applicant: Sun Drilling Products Corporation, Belle Chasse, LA (US)

(72) Inventor: Jozef Bicerano, Midland, MI (US)

(73) Assignee: Sun Drilling Products Corporation, Belle Chasse, LA (US)

( * ) Notice: Subject to any disclaimer, the term of this patent is extended or adjusted under 35 U.S.C. 154(b) by 83 days.

(21) Appl. No.: 13/752,362

(22) Filed: Jan. 28, 2013

(65) Prior Publication Data

US 2013/0225729 A1 Aug. 29, 2013

Related U.S. Application Data

(60) Continuation of application No. 13/396,296, filed on Feb. 14, 2012, now Pat. No. 8,361,934, which is a division of application No. 11/451,697, filed on Jun. 13, 2006, now abandoned.

(60) Provisional application No. 60/689,899, filed on Jun. 13, 2005.

(51) Int. Cl.
| | | |
|---|---|---|
| *C09K 8/80* | (2006.01) | |
| *C09K 8/92* | (2006.01) | |
| *C04B 16/04* | (2006.01) | |
| *C08J 3/12* | (2006.01) | |
| *C08J 3/28* | (2006.01) | |
| *C09K 8/035* | (2006.01) | |

(52) U.S. Cl.
CPC . *C04B 16/04* (2013.01); *C08J 3/12* (2013.01); *C08J 3/28* (2013.01); *C08J 2325/04* (2013.01); *C09K 8/035* (2013.01); *C09K 8/80* (2013.01); *C09K 8/92* (2013.01)

(58) Field of Classification Search
CPC .......................................................... C09K 6/24
USPC ............................. 524/8; 166/308.1; 507/117
See application file for complete search history.

(56) References Cited

U.S. PATENT DOCUMENTS 7,438,757 B2 * 10/2008 Williams et al. .............. 106/724

* cited by examiner

*Primary Examiner* — Kelechi Egwim
(74) *Attorney, Agent, or Firm* — Morgan, Lewis & Bockius LLP

(57) ABSTRACT

Use of two different methods, either each by itself or in combination, to enhance the stiffness, strength, maximum possible use temperature, and environmental resistance of thermoset polymer particles is disclosed. One method is the application of post-polymerization process steps (and especially heat treatment) to advance the curing reaction and to thus obtain a more densely crosslinked polymer network. The other method is the incorporation of nanofillers, resulting in a heterogeneous "nanocomposite" morphology. Nanofiller incorporation and post-polymerization heat treatment can also be combined to obtain the benefits of both methods simultaneously. The present invention relates to the development of thermoset nanocomposite particles. Optional further improvement of the heat resistance and environmental resistance of said particles via post-polymerization heat treatment; processes for the manufacture of said particles; and use of said particles in the construction, drilling, completion and/or fracture stimulation of oil and natural gas wells are described.

7 Claims, 7 Drawing Sheets

US 9,006,314 B2

THERMOSET PARTICLES WITH ENHANCED CROSSLINKING, PRODUCTION, AND THEIR USE IN OIL AND NATURAL GAS DRILLING APPLICATIONS

CROSS-REFERENCE TO RELATED APPLICATIONS

The present application is a continuation of U.S. patent application Ser. No. 13/396,296, filed 14 Feb. 2012, (now allowed), which in turn is a divisional of U.S. patent application Ser. No. 11/451,697, filed 13 Jun. 2006, (now abandoned), which in turn claims priority from U.S. Provisional Application Ser. No. 60/689,899, filed 13 Jun. 2005, all of which are hereby incorporated by reference herein in their entirety.

FIELD OF THE INVENTION

The present invention relates to lightweight thermoset polymer particles, to processes for the manufacture of such particles, and to applications of such particles. It is possible to use a wide range of thermoset polymers as the main constituents of the particles of the invention, and to produce said particles by means of a wide range of fabrication techniques. Without reducing the generality of the invention, in its currently preferred embodiments, the thermoset polymer consists of a terpolymer of styrene, ethylinylbenzene and divinylbenzene; suspension polymerization is performed to prepare the particles, and post-polymerization heat treatment is performed with the particles placed in an unreactive gaseous environment with nitrogen as the preferred unreactive gas to further advance the curing of the thermoset polymer. When executed in the manner taught by this disclosure, many properties of both the individual particles and packings of the particles can be improved by the practice of the invention. The particles exhibit enhanced stiffness, strength, heat resistance, and resistance to aggressive environments; as well as the improved retention of high conductivity of liquids and gases through packings of the particles in aggressive environments under high compressive loads at elevated temperatures. The thermoset polymer particles of the invention can be used in many applications. These applications include, but are not limited to, the construction, drilling, completion and/or fracture stimulation of oil and natural gas wells; for example, as a proppant partial monolayer, a proppant pack, an integral component of a gravel pack completion, a ball bearing, a solid lubricant, a drilling mud constituent, and/or a cement additive.

BACKGROUND

The background of the invention can be described most clearly, and hence the invention can be taught most effectively, by subdividing this section in three subsections. The first subsection will provide some general background regarding the role of crosslinked (and especially stiff and strong thermoset) particles in the field of the invention. The second subsection will describe the prior art that has been taught in the patent literature. The third subsection will provide additional relevant background information selected from the vast scientific literature on polymer materials science and chemistry, to further facilitate the teaching of the invention.

A. General Background

Crosslinked polymer (and especially stiff and strong thermoset) particles are used in many applications requiring high stiffness, high mechanical strength, high temperature resistance, and/or high resistance to aggressive environments. Crosslinked polymer particles can be prepared by reacting monomers or oligomers possessing three or more reactive chemical functionalities, as well as by reacting mixtures of monomers and/or oligomers at least one ingredient of which possesses three or more reactive chemical functionalities.

The intrinsic advantages of crosslinked polymer particles over polymer particles lacking a network consisting of covalent chemical bonds in such applications become especially obvious if an acceptable level of performance must be maintained for a prolonged period (such as many years, or in some applications even several decades) under the combined effects of mechanical deformation, heat, and/or severe environmental insults. For example, many high-performance thermoplastic polymers, which have excellent mechanical properties and which are hence used successfully under a variety of conditions, are unsuitable for applications where they must maintain their good mechanical properties for many years in the presence of heat and/or chemicals, because they consist of assemblies of individual polymer chains. Over time, the deformation of such assemblies of individual polymer chains at an elevated temperature can cause unacceptable amounts of creep, and furthermore solvents and/or aggressive chemicals present in the environment can gradually diffuse into them and degrade their performance severely (and in some cases even dissolve them). By contrast, the presence of a well-formed continuous network of covalent bonds restrains the molecules, thus helping retain an acceptable level of performance under severe use conditions over a much longer time period.

Oil and natural gas well construction activities, including drilling, completion and stimulation applications (such as proppants, gravel pack components, ball bearings, solid lubricants, drilling mud constituents, and/or cement additives), require the use of particulate materials, in most instances preferably of as nearly spherical a shape as possible. These (preferably substantially spherical) particles must generally be made from materials that have excellent mechanical properties. The mechanical properties of greatest interest in most such applications are stiffness (resistance to deformation) and strength under compressive loads, combined with sufficient "toughness" to avoid the brittle fracture of the particles into small pieces commonly known as "fines". In addition, the particles must have excellent heat resistance in order to be able to withstand the combination of high compressive load and high temperature that normally becomes increasingly more severe as one drills deeper. In other words, particles that are intended for use deeper in a well must be able to withstand not only the higher overburden load resulting from the greater depth, but also the higher temperature that accompanies that higher overburden load as a result of the nature of geothermal gradients. Finally, these materials must be able to withstand the effects of the severe environmental insults (resulting from the presence of a variety of hydrocarbon and possibly solvent molecules as well as water, at simultaneously elevated temperatures and compressive loads) that the particles will encounter deep in an oil or natural gas well. The need for relatively lightweight high performance materials for use in these particulate components in applications related to the construction, drilling, completion and/or fracture stimulation of oil and natural gas wells thus becomes obvious. Consequently, while such uses constitute only a small fraction of the applications of stiff and strong materials, they provide fertile territory for the development of new or improved materials and manufacturing processes for the fabrication of such materials.

We will focus much of the remaining discussion of the background of the invention on the use of particulate materials as proppants. One key measure of end use performance of proppants is the retention of high conductivity of liquids and gases through packings of the particles in aggressive environments under high compressive loads at elevated temperatures.

The use of stiff and strong solid proppants has a long history in the oil and natural gas industry. Throughout most of this history, particles made from polymeric materials (including crosslinked polymers) have been considered to be unsuitable for use by themselves as proppants. The reason for this prejudice is the perception that polymers are too deformable, as well as lacking in the ability to withstand the combination of elevated compressive loads, temperatures and aggressive environments that are commonly encountered in oil and natural gas wells. Consequently, work on proppant material development has focused mainly on sands, on ceramics, and on sands and ceramics coated by crosslinked polymers to improve some aspects of their performance. This situation has prevailed despite the fact that most polymers have densities that are much closer to that of water so that in particulate form they can be transported much more readily into a fracture by low-density fracturing or carrier fluids such as unviscosified water.

Nonetheless, the obvious practical advantages [see a review by Edgeman (2004)] of developing the ability to use lightweight particles that possess almost neutral buoyancy relative to water have stimulated a considerable amount of work over the years. However, as will be seen from the review of the prior art provided below, progress in this field of invention has been very slow as a result of the many technical challenges that exist to the successful development of cost-effective lightweight particles that possess sufficient stiffness, strength and heat resistance.

B. Prior Art

The prior art can be described most clearly, and hence the invention can be placed in the proper context most effectively, by subdividing this section into two subsections. The first subsection will describe prior art related to the development of "as-polymerized" thermoset polymer particles. The second subsection will describe prior art related to the development of thermoset polymer particles that are subjected to post-polymerization heat treatment.

1. "As-Polymerized" Thermoset Polymer Particles

As discussed above, particles made from polymeric materials have historically been considered to be unsuitable for use by themselves as proppants. Consequently, their past uses in proppant materials have focused mainly on their placement as coatings on sands and ceramics, in order to improve some aspects of the performance of the sand and ceramic proppants.

Significant progress was made in the use of crosslinked polymeric particles themselves as constituents of proppant formulations in prior art taught by Rickards, et al. (U.S. Pat. No. 6,059,034; U.S. Pat. No. 6,330,916). However, these inventors still did not consider or describe the polymeric particles as proppants. Their invention only related to the use of the polymer particles in blends with particles of more conventional proppants such as sands or ceramics. They taught that the sand or ceramic particles are the proppant particles, and that the "deformable particulate material" consisting of polymer particles mainly serves to improve the fracture conductivity, reduce the generation of fines and/or reduce proppant flowback relative to the unblended sand or ceramic proppants. Thus while their invention differs significantly from the prior art in the sense that the polymer is used in particulate form rather than being used as a coating, it shares with the prior art the limitation that the polymer still serves merely as a modifier improving the performance of a sand or ceramic proppant rather than being considered for use as a proppant in its own right.

Bienvenu (U.S. Pat. No. 5,531,274) disclosed progress towards the development of lightweight proppants consisting of high-strength crosslinked polymeric particles for use in hydraulic fracturing applications. However, embodiments of this prior art, based on the use of styrene-divinylbenzene (S-DVB) copolymer beads manufactured by using conventional fabrication technology and purchased from a commercial supplier, failed to provide an acceptable balance of performance and price. They cost far more than the test standard (Jordan sand) while being outperformed by Jordan sand in terms of the liquid conductivity and liquid permeability characteristics of their packings measured according to the industry-standard API RP 61 testing procedure. [This procedure is described by the American Petroleum Institute in its publication titled "Recommended Practices for Evaluating Short Term Proppant Pack Conductivity" (first edition, Oct. 1, 1989).] The need to use a very large amount of an expensive crosslinker (50 to 80% by weight of DVB) in order to obtain reasonable performance (not too inferior to that of Jordan Sand) was a key factor in the higher cost that accompanied the lower performance.

The most advanced prior art in stiff and strong crosslinked "as-polymerized" polymer particle technologies for use in applications in oil and natural gas drilling was developed by Albright (U.S. Pat. No. 6,248,838) who taught the concept of a "rigid chain entanglement crosslinked polymer". In summary, the reactive formulation and the processing conditions were modified to achieve "rapid rate polymerization". While not improving the extent of covalent crosslinking relative to conventional isothermal polymerization, rapid rate polymerization results in the "trapping" of an unusually large number of physical entanglements in the polymer. These additional entanglements can result in a major improvement of many properties. For example, the liquid conductivities of packings of S-DVB copolymer beads with $w_{DVB}$=0.2 synthesized via rapid rate polymerization are comparable to those that were found by Bienvenu (U.S. Pat. No. 5,531,274) for packings of conventionally produced S-DVB beads at the much higher DVB level of $w_{DVB}$=0.5. Albright (U.S. Pat. No. 6,248,838) thus provided the key technical breakthrough that enabled the development of the first generation of crosslinked polymer beads possessing sufficiently attractive combinations of performance and price characteristics to result in their commercial use in their own right as solid polymeric proppants.

2. Heat-Treated Thermoset Polymer Particles

There is no prior art that relates to the development of heat-treated thermoset polymer particles that have not been reinforced by rigid fillers or by nanofillers for use in oil and natural gas well construction applications. One needs to look into another field of technology to find prior art of some relevance related to such "unfilled" heat-treated thermoset polymer particles. Nishimori, et. al. (JP1992-22230) focused on the development of particles for use in liquid crystal display panels. They taught the use of post-polymerization heat treatment to increase the compressive elastic modulus of S-DVB particles at room temperature. They only claimed compositions polymerized from reactive monomer mixtures containing 20% or more by weight of DVB or other crosslinkable monomer(s) prior to the heat treatment. They stated explicitly that improvements obtained with lower weight fractions of the crosslinkable monomer(s) were insufficient and that hence such compositions were excluded from the scope of their patent.

C. Scientific Literature

The development of thermoset polymers requires the consideration of a vast and multidisciplinary range of polymer materials science and chemistry challenges. It is essential to convey these challenges in the context of the fundamental scientific literature.

Bicerano (2002) provides a broad overview of polymer materials science that can be used as a general reference for most aspects of the following discussion. Additional references will also be provided below, to other publications which treat specific issues in greater detail than what could be accommodated in Bicerano (2002).

1. Selected Fundamental Aspects of the Curing of Crosslinked Polymers

It is essential, first, to review some fundamental aspects of the curing of crosslinked polymers, which are applicable to such polymers regardless of their form (particulate, coating, or bulk).

The properties of crosslinked polymers prepared by standard manufacturing processes are often limited by the fact that such processes typically result in incomplete curing. For example, in an isothermal polymerization process, as the glass transition temperature ($T_g$) of the growing polymer network increases, it may reach the polymerization temperature while the reaction is still in progress. If this happens, then the molecular motions slow down significantly so that further curing also slows down significantly. Incomplete curing yields a polymer network that is less densely crosslinked than the theoretical limit expected from the functionalities and relative amounts of the starting reactants. For example, a mixture of monomers might contain 80% DVB by weight as a crosslinker but the final extent of crosslinking that is attained may not be much greater than what was attained with a much smaller percentage of DVB. This situation results in lower stiffness, lower strength, lower heat resistance, and lower environmental resistance than the thermoset is capable of manifesting when it is fully cured and thus maximally crosslinked.

When the results of the first scan and the second scan of S-DVB beads containing various weight fractions of DVB ($w_{DVB}$), obtained by Differential Scanning calorimetry (DSC), as reported by Bicerano, et al. (1996) (see FIG. 1) are compared, it becomes clear that the low performance and high cost of the "as purchased" S-DVB beads utilized by Bienvenu (U.S. Pat. No. 5,531,274) are related to incomplete curing. This incomplete curing results in the ineffective utilization of DVB as a crosslinker and thus in the incomplete development of the crosslinked network. In summary, Bicerano, et al. (1996), showed that the $T_g$ of typical "as-polymerized" S-DVB copolymers, as measured by the first DSC scan, increased only slowly with increasing $w_{DVB}$, and furthermore that the rate of further increase of $T_g$ slowed down drastically for $w_{DVB}$>0.08. By contrast, in the second DSC scan (performed on S-DVB specimens whose curing had been driven much closer to completion as a result of the temperature ramp that had been applied during the first scan), $T_g$ grew much more rapidly with $w_{DVB}$ over the entire range of up to $w_{DVB}$=0.2458 that was studied. The more extensively cured samples resulting from the thermal history imposed by the first DSC scan can, thus, be considered to provide much closer approximations to the ideal theoretical limit of a "fully cured" polymer network.

2. Effects of Heat Treatment on Key Properties of Thermoset Polymers a. Maximum Possible Use Temperature As was illustrated by Bicerano, et al. (1996) for S-DVB copolymers with $w_{DVB}$ of up to 0.2458, enhancing the state of cure of a thermoset polymer network can increase $T_g$ very significantly relative to the $T_g$ of the "as-polymerized" material. In practice, the heat distortion temperature (HDT) is used most often as a practical indicator of the softening temperature of a polymer under load. As was shown by Takemori (1979), a systematic understanding of the HDT is possible through its direct correlation with the temperature dependences of the tensile (or equivalently, compressive) and shear elastic moduli. For amorphous polymers, the precipitous decrease of these elastic moduli as $T_g$ is approached from below renders the HDT well-defined, reproducible, and predictable. HDT is thus closely related to (and usually slightly lower than) $T_g$ for amorphous polymers, so that it can be increased significantly by increasing $T_g$ significantly.

The HDT decreases gradually with increasing magnitude of the load used in its measurement. For example, for general-purpose polystyrene (which has $T_g$=100° C.), HDT=95° C. under a load of 0.46 MPa and HDT=85° C. under a load of 1.82 MPa are typical values. However, the compressive loads deep in an oil well or natural gas well are typically far higher than the standard loads (0.46 MPa and 1.82 MPa) used in measuring the HDT. Consequently, amorphous thermoset polymer particles can be expected to begin to deform significantly at a lower temperature than the HDT of the polymer measured under the standard high load of 1.82 MPa. This deformation will cause a decrease in the conductivities of liquids and gases through the propped fracture, and hence in the loss of effectiveness as a proppant, at a somewhat lower temperature than the HDT value of the polymer measured under the standard load of 1.82 MPa.

b. Mechanical Properties

As was discussed earlier, Nishimori, et. al. (JP1992-22230) used heat treatment to increase the compressive elastic modulus of their S-DVB particles (intended for use in liquid crystal display panels) significantly at room temperature (and hence far below $T_g$). Deformability under a compressive load is inversely proportional to the compressive elastic modulus. It is, therefore, important to consider whether one may also anticipate major benefits from heat treatment in terms of the reduction of the deformability of thermoset polymer particles intended for oil and natural gas drilling applications, when these particles are used in subterranean environments where the temperature is far below the $T_g$ of the particles. As explained below, the enhancement of curing via post-polymerization heat treatment is generally expected to have a smaller effect on the compressive elastic modulus (and hence on the proppant performance) of thermoset polymer particles when used in oil and natural gas drilling applications at temperatures far below their $T_g$.

Nishimori, et. al. (JP1992-22230) used very large amounts of DVB ($w_{DVB}$>>0.2). By contrast, in general, much smaller amounts of DVB ($w_{DVB}$≥0.2) must be used for economic reasons in the "lower value" oil and natural gas drilling applications. The elastic moduli of a polymer at temperatures far below $T_g$ are determined primarily by deformations that are of a rather local nature and hence on a short length scale. Some enhancement of the crosslink density via further curing (when the network junctions created by the crosslinks are far away from each other to begin with) will hence not normally have nearly as large an effect on the elastic moduli as when the network junctions are very close to each other to begin with and then are brought even closer by the enhancement of curing via heat treatment. Consequently, while the compressive elastic modulus can be expected to increase significantly upon heat treatment when $w_{DVB}$ is very large, any such effect will normally be less pronounced at low values of $w_{DVB}$. In summary, it can thus generally be expected that the enhancement of the compressive elastic modulus at temperatures far below $T_g$ will probably be small for the types of formulations that are most likely to be used in the synthesis of thermoset polymer particles for oil and natural gas drilling applications.

SUMMARY OF THE INVENTION

The present invention involves a novel approach towards the practical development of stiff, strong, tough, heat resistant, and environmentally resistant ultralightweight particles, for use in the construction, drilling, completion and/or fracture stimulation of oil and natural gas wells.

The disclosure is summarized below in three key aspects: (A) Compositions of Matter (thermoset particles that exhibit improved properties compared with prior art), (B) Processes (methods for manufacture of the compositions of matter), and (C) Applications (utilization of the compositions of matter in the construction, drilling, completion and/or fracture stimulation of oil and natural gas wells).

The disclosure describes lightweight thermoset polymer particles whose properties are improved relative to prior art. The particles targeted for development include, but are not limited to, terpolymers of styrene, ethylinylbenzene and divinylbenzene. The particles exhibit any one or any combination of the following properties: enhanced stiffness, strength, heat resistance, and/or resistance to aggressive environments; and/or improved retention of high conductivity of liquids and/or gases through packings of the particles when the packings are placed in potentially aggressive environments under high compressive loads at elevated temperatures.

The disclosure also describes processes that can be used to manufacture the particles. The fabrication processes targeted for development include, but are not limited to, suspension polymerization to prepare the "as-polymerized" particles, and post-polymerization process(es) to further advance the curing of the polymer. The post-polymerization process(es) may optionally comprise heat treatment. The particles during the heat treatment are placed in an unreactive gaseous environment with nitrogen as the preferred unreactive gas.

The disclosure finally describes the use of the particles in practical applications. The targeted applications include, but are not limited to, the construction, drilling, completion and/or fracture stimulation of oil and natural gas wells; for example, as a proppant partial monolayer, a proppant pack, an integral component of a gravel pack completion, a ball bearing, a solid lubricant, a drilling mud constituent, and/or a cement additive.

A. Compositions of Matter

The compositions of matter of the present invention are thermoset polymer particles. Any additional formulation component(s) familiar to those skilled in the art can also be used during the preparation of the particles; such as initiators, catalysts, inhibitors, dispersants, stabilizers, rheology modifiers, buffers, antioxidants, defoamers, impact modifiers, plasticizers, pigments, flame retardants, smoke retardants, or mixtures thereof. Some of the additional component(s) may also become either partially or completely incorporated into the particles in some embodiments of the invention. However, the only required component of the particles is a thermoset polymer.

Any rigid thermoset polymer may be used as the polymer of the present invention. Rigid thermoset polymers are, in general, amorphous polymers where covalent crosslinks provide a three-dimensional network. However, unlike thermoset elastomers (often referred to as "rubbers") which also possess a three-dimensional network of covalent crosslinks, the rigid thermosets are, by definition, "stiff". In other words, they have high elastic moduli at "room temperature" (25° C.), and often up to much higher temperatures, because their combinations of chain segment stiffness and crosslink density result in a high glass transition temperature.

Some examples of rigid thermoset polymers that can be used as materials of the invention will be provided below. It is to be understood that these examples are being provided without reducing the generality of the invention, merely to facilitate the teaching of the invention.

Commonly used rigid thermoset polymers include, but are not limited to, crosslinked epoxies, epoxy vinyl esters, polyesters, phenolics, melamine-based resins, polyurethanes, and polyureas. Rigid thermoset polymers that are used less often because of their high cost despite their exceptional performance include, but are not limited to, crosslinked polyimides. These various types of polymers can, in different embodiments of the invention, be prepared by starting either from their monomers, or from oligomers that are often referred to as "prepolymers", or from suitable mixtures of monomers and oligomers.

Many additional types of rigid thermoset polymers can also be used in particles of the invention, and are all within the scope of the invention. Such polymers include, but are not limited to, various families of crosslinked copolymers prepared most often by the polymerization of vinylic monomers, of vinylidene monomers, or of mixtures thereof.

The "vinyl fragment" is commonly defined as the $CH_2$=CH— fragment. So a "vinylic monomer" is a monomer of the general structure $CH_2$=CHR where R can be any one of a vast variety of molecular fragments or atoms (other than hydrogen). When a vinylic monomer $CH_2$=CHR reacts, it is incorporated into the polymer as the —$CH_2$—CHR— repeat unit. Among rigid thermosets built from vinylic monomers, the crosslinked styrenics and crosslinked acrylics are especially familiar to workers in the field. Some other familiar types of vinylic monomers (among others) include the olefins, vinyl alcohols, vinyl esters, and vinyl halides.

The "vinylidene fragment" is commonly defined as the $CH_2$=CR"— fragment. So a "vinylidene monomer" is a monomer of the general structure $CH_2$=CR'R" where R' and R" can each be any one of a vast variety of molecular fragments or atoms (other than hydrogen). When a vinylidene monomer $CH_2$=CR'R" reacts, it is incorporated into a polymer as the —$CH_2$—CR'R"— repeat unit. Among rigid thermosets built from vinylidene polymers, the crosslinked alkyl acrylics [such as crosslinked poly(methyl methacrylate)] are especially familiar to workers in the field. However, vinylidene monomers similar to each type of vinyl monomer (such as the styrenics, acrylates, olefins, vinyl alcohols, vinyl esters and vinyl halides, among others) can be prepared. One example of particular interest in the context of styrenic monomers is □-methyl styrene, a vinylidene-type monomer that differs from styrene (a vinyl-type monomer) by having a methyl (—$CH_3$) group serving as the R" fragment replacing the hydrogen atom attached to the □-carbon.

Thermosets based on vinylic monomers, on vinylidene monomers, or on mixtures thereof, are typically prepared by the reaction of a mixture containing one or more non-crosslinking (difunctional) monomer and one or more crosslinking (three or higher functional) monomers. All variations in the choices of the non-crosslinking monomer(s), the crosslinking monomers(s), and their relative amounts [subject solely to the limitation that the quantity of the crosslinking monomer(s) must not be less than 1% by weight], are within the scope of the invention.

Without reducing the generality of the invention, in its currently preferred embodiments, the thermoset polymer particles consist of a terpolymer of styrene (non-crosslinking), ethylinylbenzene (also non-crosslinking), and divinylbenzene (crosslinking), with the weight fraction of divinylbenzene ranging from 3% to 35% by weight of the starting monomer mixture.

B. Processes

If a suitable post-polymerization process step is applied to thermoset polymer particles, in many cases the curing reaction will be driven further towards completion so that $T_g$ (and hence also the maximum possible use temperature) will increase. This is the most commonly obtained benefit of applying a post-polymerization process step. In some instances, there may also be further benefits, such as an increase in the compressive elastic modulus even at temperatures that are far below $T_g$, and an increase of such magnitude in the resistance to aggressive environments as to enhance significantly the potential range of applications of the particles.

Processes that may be used to enhance the degree of curing of a thermoset polymer include, but are not limited to, heat treatment (which may be combined with stirring, flow and/or sonication to enhance its effectiveness), electron beam irradiation, and ultraviolet irradiation. FIG. 2 provides an idealized schematic illustration of the benefits of implementing such methods. We focused mainly on the use of heat treatment in order to increase the $T_g$ of the thermoset polymer.

The processes that may be used for the fabrication of the thermoset polymer particles of the invention comprise two major steps. The first step is the formation of the particles by means of a polymerization process. The second step is the use of an appropriate postcuring method to advance the curing reaction and to thus obtain a thermoset polymer network that approaches the "fully cured" limit. Consequently, this subsection will be further subdivided into two subsections, dealing with polymerization and with postcure respectively.

1. Polymerization and Network Formation

Any method for the fabrication of thermoset polymer particles known to those skilled in the art may be used to prepare embodiments of the particles of the invention. Without reducing the generality of the invention, our preferred method will be discussed below to facilitate the teaching of the invention.

It is especially practical to prepare the particles by using methods that can produce the particles directly in the desired (usually substantially spherical) shape during polymerization from the starting monomers. (While it is a goal of this invention to create spherical particles, it is understood that it is exceedingly difficult as well as unnecessary to obtain perfectly spherical particles. Therefore, particles with minor deviations from a perfectly spherical shape are considered perfectly spherical for the purposes of this disclosure.) Suspension (droplet) polymerization is the most powerful method available for accomplishing this objective.

Two main approaches exist to suspension polymerization. The first approach is isothermal polymerization which is the conventional approach that has been practiced for many decades. The second approach is "rapid rate polymerization" as taught by Albright (U.S. Pat. No. 6,248,838) which is incorporated herein by reference in its entirety. Without reducing the generality of the invention, suspension polymerization as performed via the rapid rate polymerization approach taught by Albright (U.S. Pat. No. 6,248,838) is used in the current preferred embodiments of the invention.

2. Post-Polymerization Advancement of Curing and Network Formation

As was discussed earlier and illustrated in FIG. 1 with the data of Bicerano, et al. (1996), typical processes for the synthesis of thermoset polymers may result in the formation of incompletely cured networks, and may hence produce thermosets with lower glass transition temperatures and lower maximum use temperatures than is achievable with the chosen formulation of reactants. Consequently, the use of a post-polymerization process step (or a sequence of such process steps) to advance the curing of a thermoset polymer particle of the invention is an aspect of the invention. Suitable methods include, but are not limited to, heat treatment (also known as "annealing"), electron beam irradiation, and ultraviolet irradiation.

Post-polymerization heat treatment is a very powerful method for improving the properties and performance of S-DVB copolymers (as well as of many other types of thermoset polymers) by helping the polymer network approach its "full cure" limit. It is, in fact, the most easily implementable method for advancing the state of cure of S-DVB copolymer particles. However, it is important to recognize that another post-polymerization method (such as electron beam irradiation or ultraviolet irradiation) may be the most readily implementable one for advancing the state of cure of some other type of thermoset polymer. The use of any suitable method for advancing the curing of the thermoset polymer that is being used as a particle of the present invention after polymerization is within the scope of the invention.

Without reducing the generality of the invention, among the suitable methods, heat treatment is used as the post-polymerization method to enhance the curing of the thermoset polymer in the preferred embodiments of the invention. Any desired thermal history can be imposed; such as, but not limited to, isothermal annealing at a fixed temperature; nonisothermal heat exposure with either a continuous or a step function temperature ramp; or any combination of continuous temperature ramps, step function temperature ramps, and/or periods of isothermal annealing at fixed temperatures. In practice, while there is great flexibility in the choice of a thermal history, it must be selected carefully to drive the curing reaction to the maximum final extent possible without inducing unacceptable levels of thermal degradation.

Any significant increase in $T_g$ by means of improved curing will translate directly into an increase of comparable magnitude in the practical softening temperature of the polymer particles under the compressive load imposed by the subterranean environment. Consequently, a significant increase of the maximum possible use temperature of the thermoset polymer particles is the most common benefit of advancing the extent of curing by heat treatment.

A practical concern during the imposition of heat treatment is related to the amount of material that is being subjected to heat treatment simultaneously. For example, very small amounts of material can be heat treated uniformly and effectively in vacuum; or in any inert (non-oxidizing) gaseous medium, such as, but not limited to, a helium or nitrogen "blanket". However, heat transfer in a gaseous medium is generally not nearly as effective as heat transfer in an appropriately selected liquid medium. Consequently, during the heat treatment of large quantities of the particles of the invention (such as, but not limited to, the output of a run of a commercial-scale batch production reactor), it is usually necessary to use a liquid medium, and furthermore also to stir the particles vigorously to ensure that the heat treatment is applied as uniformly as possible. Serious quality problems may arise if heat treatment is not applied uniformly; for example, as a result of the particles that were initially near the heat source being overexposed to heat and thus damaged, while the particles that were initially far away from the heat source are not exposed to sufficient heat and are thus not sufficiently postcured.

If a gaseous or a liquid heat treatment medium is used, the medium may contain, without limitation, one or a mixture of any number of types of constituents of different molecular structure. However, in practice, the medium must be selected carefully to ensure that its molecules will not react with the crosslinked polymer particles to a sufficient extent to cause significant oxidative and/or other types of chemical degradation. In this context, it must also be kept in mind that many types of molecules which do not react with a polymer at ambient temperature may react strongly with the polymer at elevated temperatures. The most relevant example in the present context is that oxygen itself does not react with S-DVB copolymers at room temperature, while it causes severe oxidative degradation of S-DVB copolymers at elevated temperatures where there would not be much thermal degradation in its absence.

Furthermore, in considering the choice of medium for heat treatment, it is also important to keep in mind that the molecules constituting a molecular fluid can swell organic polymers, potentially causing "plasticization" and thus resulting in undesirable reductions of $T_g$ and of the maximum possible use temperature. The magnitude of any such detrimental effect increases with increasing similarity between the chemical structures of the molecules in the heat treatment medium and of the polymer chains. For example, a heat transfer fluid consisting of aromatic molecules will tend to swell a styrene-divinylbenzene copolymer particle. The magnitude of this detrimental effect will increase with decreasing relative amount of the crosslinking monomer (divinylbenzene) used in the formulation. For example, a styrene-divinylbenzene copolymer prepared from a formulation containing only 3% by weight of divinylbenzene will be far more susceptible to swelling in an aromatic liquid than a copolymer prepared from a formulation containing 35% divinylbenzene.

Geothermal gradients determine the temperature of the downhole environment. The temperature can be sufficiently high in some downhole environments to become effective in the postcuring of some compositions of matter covered by the invention. Consequently, the "in situ" postcuring of the polymer particles, wherein the particles are placed in the downhole environment of a hydrocarbon reservoir without heat treatment and the heat treatment then takes place in the environment as a result of the elevated temperature of the environment, is also within the scope of the invention.

It is important to note that the polymer particles are kept in the downhole environment of a hydrocarbon reservoir for a very long time in many applications. Consequently, temperatures which may be too low to provide a reasonable cycle time in postcuring as a manufacturing step may often be adequate for the "in situ" postcuring of the particles in the downhole environment during use. On the other hand, the implementation of postcuring as a manufacturing step often has the advantage of providing for better quality control and greater uniformity of particle properties. While each of these two approaches may hence be more suitable than the other one for use in different situations, they both fall within the scope of the invention. Furthermore, their combination by (a) applying a postcuring step during manufacture to advance polymerization and network formation, followed by (b) the "in situ" completion of the postcuring in the downhole environment, is also within the scope of the invention.

Various means known to those skilled in the art, including but not limited to the stirring, flow and/or sonication of an assembly of particles being subjected to heat treatment, may also be optionally used to enhance further the effectiveness of the heat treatment. The rate of thermal equilibration under a given thermal gradient, possibly combined with the application of any such additional means, depends on many factors. These factors include, but are not limited to, the amount of polymer particles being heat treated simultaneously, the shapes and certain key physical and transport properties of these particles, the shape of the vessel being used for heat treatment, the medium being used for heat treatment, whether external disturbances (such as stirring, flow and/or sonication) are being used to accelerate equilibration, and the details of the heat exposure schedule. Simulations based on the solution of the heat transfer equations may hence be used optionally to optimize the heat treatment equipment and/or the heat exposure schedule.

Without reducing the generality of the invention, in its currently preferred embodiments, the thermoset polymer particles are placed in an unreactive gaseous environment with nitrogen as the preferred unreactive gas during heat treatment. Appropriately chosen equipment is used, along with simulations based on the solution of the heat transfer equations, to optimize the heat exposure schedule so that large batches of particles can undergo thermal exposure to an extent that is sufficient to accomplish the desired effects of the heat treatment without many particles undergoing detrimental overexposure. This embodiment of the heat treatment process works especially well (without adverse effects such as degradation that could occur if an oxidative gaseous environment such as air were used and/or swelling that could occur if a liquid environment were used) in enhancing the curing of the thermoset polymer. It is, however, important to reemphasize the much broader scope of the invention and the fact that the particular currently preferred embodiments summarized above constitute just a few among the vast variety of possible qualitatively different classes of embodiments.

C. Applications

The obvious practical advantages [see a review by Edgeman (2004)] of developing the ability to use lightweight particles that possess almost neutral buoyancy relative to water have stimulated a considerable amount of work over the years. However, progress in this field of invention has been very slow as a result of the many technical challenges that exist to the successful development of cost-effective lightweight particles that possess sufficient stiffness, strength and heat resistance. The present invention has resulted in the development of such stiff, strong, tough, heat resistant, and environmentally resistant ultralightweight particles; and also of cost-effective processes for the fabrication of the particles. As a result, a broad range of potential applications can be envisioned and are being pursued for the use of the thermoset polymer particles of the invention in the construction, drilling, completion and/or fracture stimulation of oil and natural gas wells. Without reducing the generality of the invention, in its currently preferred embodiments, the specific applications that are already being evaluated are as a proppant partial monolayer, a proppant pack, an integral component of a gravel pack completion, a ball bearing, a solid lubricant, a drilling mud constituent, and/or a cement additive.

The use of assemblies of the particles as proppant partial monolayers and/or as proppant packs generally requires the particles to possess significant stiffness and strength under compressive deformation, heat resistance, and resistance to aggressive environments. Enhancements in these properties result in the ability to use the particles as proppants in hydrocarbon reservoirs that exert higher compressive loads and/or possess higher temperatures.

The most commonly used measure of proppant performance is the conductivity of liquids and/or gases (depending on the type of hydrocarbon reservoir) through packings of the particles. A minimum liquid conductivity of 100 mDft is often considered as a practical threshold for considering a packing to be useful in propping a fracture that possesses a given closure stress at a given temperature. It is also a common practice in the industry to use the simulated environment of a hydrocarbon reservoir in evaluating the conductivities of packings of particles. The API RP 61 method is currently the commonly accepted testing standard for conductivity testing in the simulated environment of a hydrocarbon reservoir. As of the date of this filing, however, work is underway to develop alternative testing standards.

It is also important to note that the current selection of preferred embodiments of the invention has resulted from our focus on application opportunities in the construction, drilling, completion and/or fracture stimulation of oil and natural gas wells. Many other applications can also be envisioned for the compositions of matter that fall within the scope of thermoset polymer particles of the invention, extending far beyond their uses by the oil and natural gas industry.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

DESCRIPTION OF THE PREFERRED EMBODIMENTS

Figure 1:
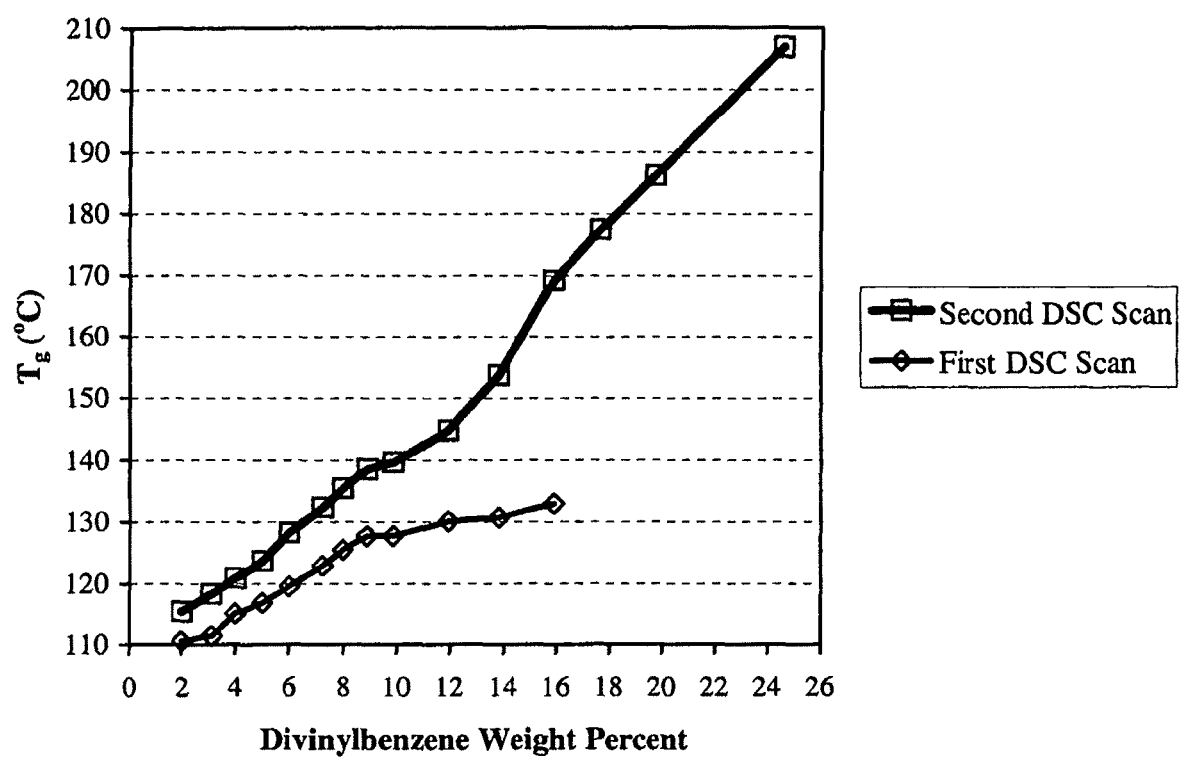
FIG. 1 shows the effects of advancing the curing reaction in a series of isothermally polymerized styrene-divinylbenzene (S-DVB) copolymers containing different DVB weight fractions via heat treatment. The results of scans of S-DVB beads containing various weight fractions of DVB ($w_{DVB}$), obtained by Differential Scanning calorimetry (DSC), and reported by Bicerano, et al. (1996), are compared. It is seen that the $T_g$ of typical "as-polymerized" S-DVB copolymers, as measured by the first DSC scan, increased only slowly with increasing $w_{DVB}$, and furthermore that the rate of further increase of $T_g$ slowed down drastically for $w_{DVB}>0.08$. By contrast, in the second DSC scan (performed on S-DVB specimens whose curing had been driven much closer to completion as a result of the temperature ramp that had been applied during the first scan), $T_g$ grew much more rapidly with $w_{DVB}$ over the entire range of up to $w_{DVB}=0.2458$ that was studied.
Figure 2:
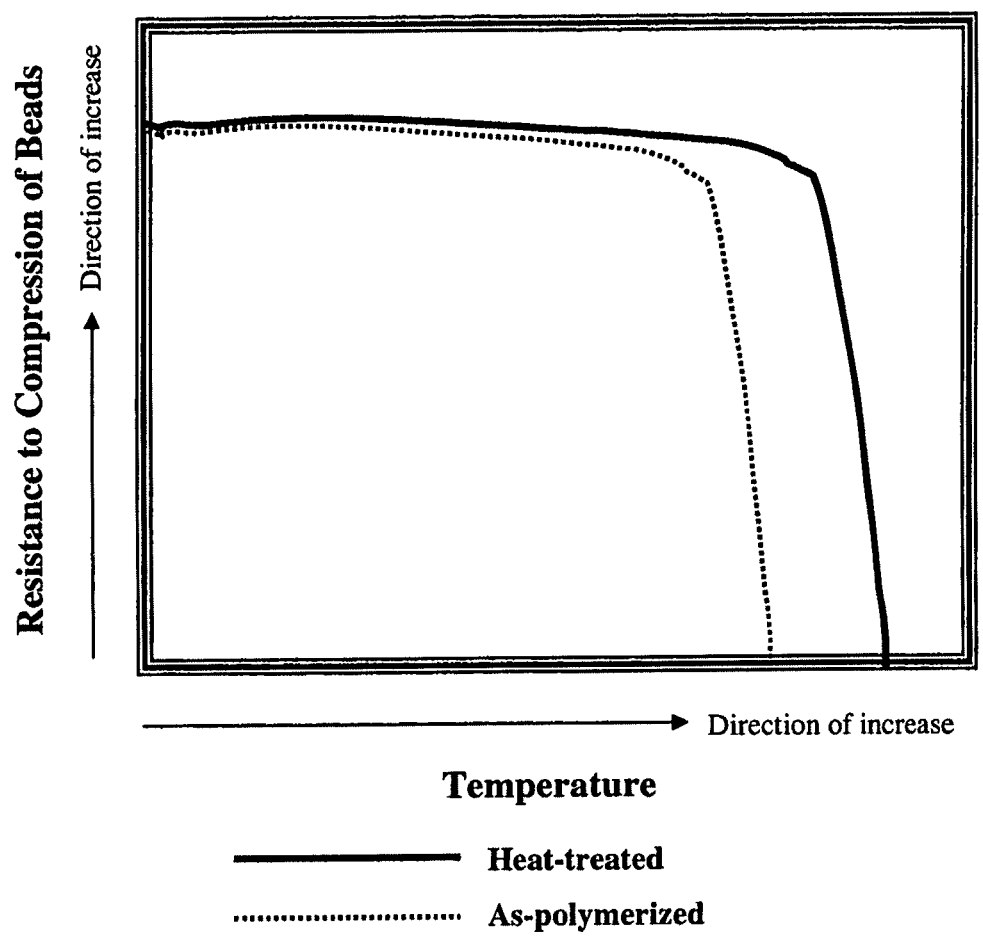
FIG. 2 provides an idealized schematic illustration, in the context of the resistance of thermoset polymer particles to compression as a function of the temperature, of the most common benefits of using the methods of the present invention. In most cases, the densification of the crosslinked polymer network via post-polymerization heat treatment will have the main benefit of increasing the softening (and hence also the maximum possible use) temperature, along with improving the environmental resistance. In some instances, enhanced stiffness and strength at temperatures that are significantly below the softening temperature may be additional benefits.

Because the invention will be understood better after further discussion of its currently preferred embodiments, further discussion of the embodiments will now be provided. It is understood that the discussion is being provided without reducing the generality of the invention, since persons skilled in the art can readily imagine many additional embodiments that fall within the full scope of the invention as taught in the SUMMARY OF THE INVENTION section.

A. Nature, Attributes and Applications of Currently Preferred Embodiments

The currently preferred embodiments of the invention are lightweight thermoset polymer particles possessing high stiffness, strength, temperature resistance, and resistance to aggressive environments. These attributes, occurring in combination, make the particles especially suitable for use in many challenging applications in the construction, drilling, completion and/or fracture stimulation of oil and natural gas wells. The applications include the use of the particles as a proppant partial monolayer, a proppant pack, an integral component of a gravel pack completion, a ball bearing, a solid lubricant, a drilling mud constituent, and/or a cement additive.

In one embodiment, the polymeric particle has a substantially cured polymer network; wherein a packing of the particles manifests a static conductivity of at least 100 mDft after 200 hours at temperatures greater than 80° F. The particles are made by a method including the steps of: forming a polymer by polymerizing a reactive mixture containing at least one of a monomer, an oligomer, or combinations thereof. The at least one of a monomer, an oligomer, or combinations thereof have three or more reactive functionalities capable of creating crosslinks between polymer chains. The particle is subjected to at least one post-polymerizing process that advances the curing of a polymer network.

B. Compositions of Matter

The preferred embodiments of the particles of the invention consist of terpolymers of styrene (S, non-crosslinking), ethylinylbenzene (EVB, also non-crosslinking), and divinylbenzene (DVB, crosslinking).

The preference for such terpolymers instead of copolymers of S and DVB is a result of economic considerations. To summarize, DVB comes mixed with EVB in the standard product grades of DVB, and the cost of DVB increases rapidly with increasing purity in special grades of DVB. EVB is a non-crosslinking (difunctional) styrenic monomer. Its incorporation into the thermoset polymer does not result in any significant changes in the properties of the polymer, compared with the use of S as the sole non-crosslinking monomer. Consequently, it is far more cost-effective to use a standard (rather than purified) grade of DVB, thus resulting in a terpolymer where some of the repeat units originate from EVB.

The amount of DVB in the terpolymer ranges from 3% to 35% by weight of the starting mixture of the three reactive monomers (S, EVB and DVB) because different applications require different maximum possible use temperatures. Even when purchased in standard product grades where it is mixed with a large weight fraction of EVB, DVB is more expensive than S. It is, hence, useful to develop different product grades where the maximum possible use temperature increases with increasing weight fraction of DVB. Customers can then purchase the grades of the particles that meet their specific application needs as cost-effectively as possible.

C. Polymerization

Suspension polymerization is performed via rapid rate polymerization, as taught by Albright (U.S. Pat. No. 6,248, 838) which is incorporated herein by reference in its entirety, for the fabrication of the particles. Rapid rate polymerization has the advantage, relative to conventional isothermal polymerization, of producing more physical entanglements in thermoset polymers (in addition to the covalent crosslinks).

The most important additional formulation component (besides the reactive monomers) that is used during polymerization is the initiator. The initiator may consist of one type molecule or a mixture of two or more types of molecules that have the ability to function as initiators. Additional formulation components, such as catalysts, inhibitors, dispersants, stabilizers, rheology modifiers, buffers, antioxidants, defoamers, impact modifiers, plasticizers, pigments, flame retardants, smoke retardants, or mixtures thereof, may also be used when needed. Some of the additional formulation component(s) may become either partially or completely incorporated into the particles in some embodiments of the invention.

D. Attainable Particle Sizes

Suspension polymerization produces substantially spherical polymer particles. (While it is a goal of this invention to create spherical particles, it is understood that it is exceedingly difficult as well as unnecessary to obtain perfectly spherical particles. Therefore, particles with minor deviations from a perfectly spherical shape are considered perfectly spherical for the purposes of this disclosure.) The particles can be varied in size by means of a number of mechanical and/or chemical methods that are well-known and well-practiced in the art of suspension polymerization. Particle diameters attainable by such means range from submicron values up to several millimeters. Hence the particles may be selectively manufactured over the entire range of sizes that are of present interest and/or that may be of future interest for applications in the oil and natural gas industry.

E. Optional Further Selection of Particles by Size

Optionally, after the completion of suspension polymerization, the particles can be separated into fractions having narrower diameter ranges by means of methods (such as, but not limited to, sieving techniques) that are well-known and well-practiced in the art of particle separations. The narrower diameter ranges include, but are not limited to, nearly monodisperse distributions. Optionally, assemblies of particles possessing bimodal or other types of special distributions, as well as assemblies of particles whose diameter distributions follow statistical distributions such as gaussian or log-normal, can also be prepared.

The optional preparation of assemblies of particles having diameter distributions of interest from any given "as polymerized" assembly of particles can be performed before or after the heat treatment of the particles. Without reducing the generality of the invention, in the currently most preferred embodiments of the invention, any optional preparation of assemblies of particles having diameter distributions of interest from the product of a run of the pilot plant or production plant reactor is performed after the completion of the heat treatment of the particles.

The particle diameters of current practical interest for various uses in the construction, drilling, completion and/or fracture stimulation of oil and natural gas wells range from 0.1 to 4 millimeters. The specific diameter distribution that would be most effective under given circumstances depends on the details of the subterranean environment in addition to depending on the type of application. The diameter distribution that would be most effective under given circumstances may be narrow or broad, monomodal or bimodal, and may also have other special features (such as following a certain statistical distribution function) depending on both the details of the subterranean environment and the type of application.

F. Heat Treatment

The particles are placed in an unreactive gaseous environment with nitrogen as the preferred unreactive gas during heat treatment in the currently preferred embodiment of the invention. The inreactive gas thus serves as the heat treatment medium. This approach works especially well (without adverse effects such as degradation that could occur if an oxidative gaseous environment such as air were used and/or swelling that could occur if a liquid environment were used) in enhancing the curing of the particles.

Gases are much less effective than liquids as heat transfer media. The use of a gaseous rather than a liquid environment hence presents engineering challenges to the heat treatment of very large batches of particles. However, these challenges to practical implementation are overcome by means of the proper choice of equipment and by the use of simulation methods.

Detailed and realistic simulations based on the solution of the heat transfer equations are hence often used optionally to optimize the heat exposure schedule. It has been found that such simulations become increasingly useful with increasing quantity of particles that will be heat treated simultaneously. The reason is the finite rate of heat transfer. The finite rate results in slower and more difficult equilibration with increasing quantity of particles and hence makes it especially important to be able to predict how to cure most of the particles further uniformly and sufficiently without overexposing many of the particles to heat.

In performing heat treatment as a manufacturing step as described above, which is the preferred embodiment of the invention, the useful temperature range is from 120° C. to 250° C., inclusive. The duration of the exposure will, in practice, decrease with the maximum temperature of exposure. More specifically, if the heat treatment temperature is 120° C., at least four hours of exposure to that temperature will be required. On the other hand, if the heat treatment temperature is 250° C., the duration of exposure to that temperature will not exceed 20 minutes. In the most preferred embodiments of the invention, the particles undergo a total exposure to temperatures in the range of 150° C. to 200° C. for a duration of 10 minutes to 90 minutes, inclusive.

In other embodiments of the invention, where heat treatment is performed "in situ" in the downhole environment, the minimum downhole temperature is 80° C. and the minimum dwell time in the downhole environment is one week. In practice, the minimum required amount of time for adequate postcuring in the downhole environment will decrease with increasing temperature of the environment. In more preferred embodiments of this class, the temperature of the downhole environment is at least 100° C. In the most preferred embodiments of this type, the temperature of the downhole environment is at least 120° C.

EXAMPLE

The currently preferred embodiments of the invention will be understood better in the context of a specific example. It is to be understood that the example is being provided without reducing the generality of the invention. Persons skilled in the art can readily imagine many additional examples that fall within the scope of the currently preferred embodiments as taught in the DETAILED DESCRIPTION OF THE INVENTION section. Persons skilled in the art can, furthermore, also readily imagine many alternative embodiments that fall within the full scope of the invention as taught in the SUMMARY OF THE INVENTION section.

A. Summary

The thermoset matrix was prepared from a formulation containing 20% DVB by weight of the starting monomer mixture. The DVB had been purchased as a mixture where only 63% by weight consisted of DVB. The actual polymerizable monomer mixture used in preparing the thermoset matrix consisted of roughly 68.73% S, 11.27% EVB and 20% DVB by weight.

Suspension polymerization was performed in a pilot plant reactor, via rapid rate polymerization as taught by Albright (U.S. Pat. No. 6,248,838) which is incorporated herein by reference in its entirety. The "single initiator" approach was utilized in applying this method. The "as-polymerized" particles obtained from this run of the pilot plant reactor (by removing some of the slurry and allowing it to dry at ambient temperature) are designated as Sample AP.

Some other particles were then removed from the of the slurry, washed, spread very thin on a tray, and heat-treated for ten minutes at 170° C. in an oven under an unreactive gas (nitrogen) blanket. These heat-treated particles will be designated as Sample IA20mG170C.

Figure 3:
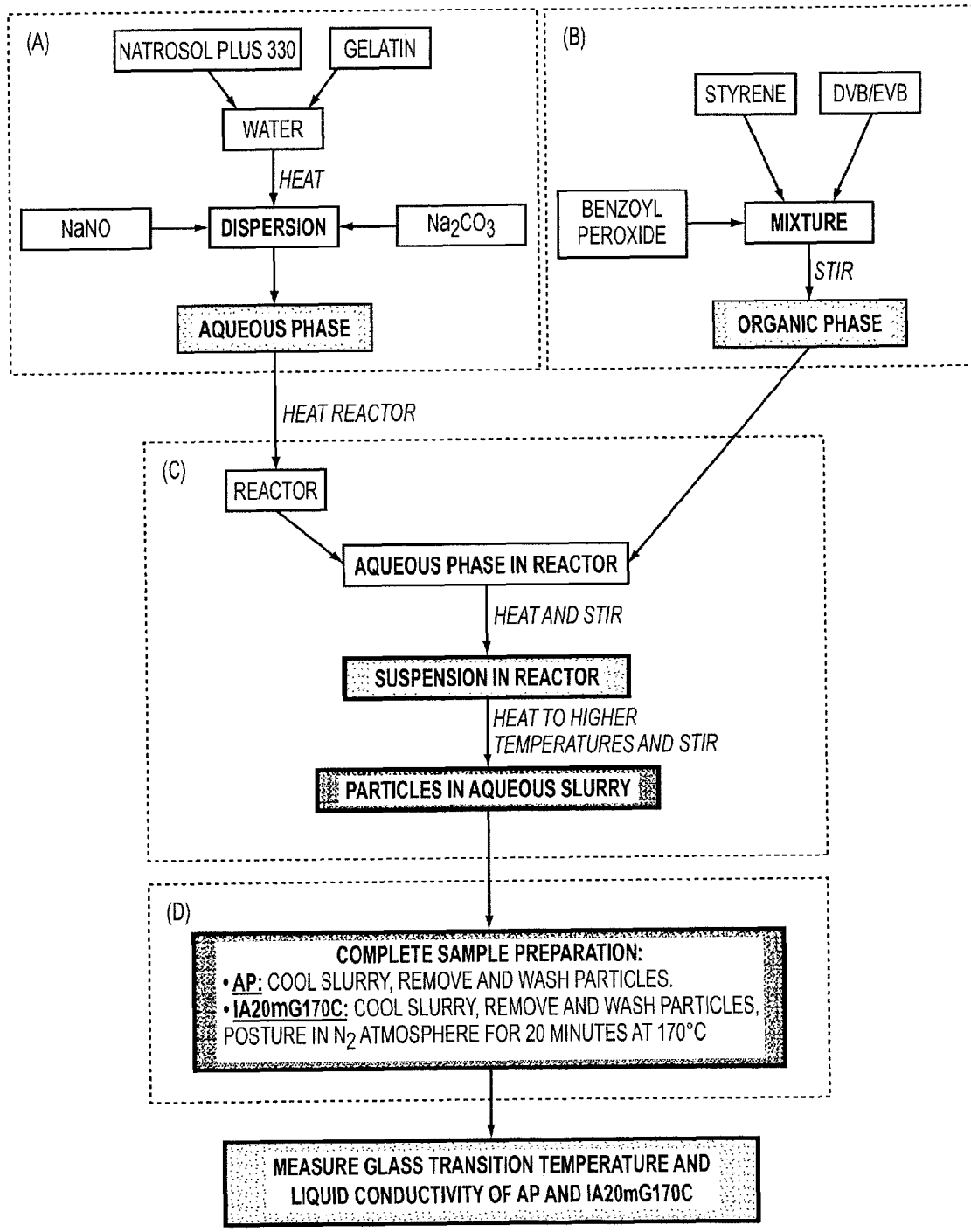
FIG. 3 provides a process flow diagram depicting the preparation of the example. It contains four major blocks; depicting the preparation of the aqueous phase (Block A), the preparation of the organic phase (Block B), the mixing of these two phases followed by suspension polymerization (Block C), and the further process steps used after polymerization to obtain the "as-polymerized" and "heat-treated" samples of particles (Block D).

FIG. 3 provides a process flow diagram depicting the preparation of the example. It contains four major blocks; depicting the preparation of the aqueous phase (Block A), the preparation of the organic phase (Block B), the mixing of these two phases followed by suspension polymerization (Block C), and the further process steps used after polymerization to obtain the "as-polymerized" and "heat-treated" samples of particles (Block D).

Particles from each of the two samples were then sent to independent testing laboratories. Differential scanning calorimetry (DSC) was performed on each sample by Impact Analytical, in Midland, Mich. The liquid conductivities of packings of the particles of each sample were measured by FracTech Laboratories, in Surrey, United Kingdom.

The following subsections will provide further details on the formulation, preparation and testing of this working example, to enable persons who are skilled in the art to reproduce the example.

B. Formulation

An aqueous phase and an organic phase must be prepared prior to suspension polymerization. The aqueous phase and the organic phase, which were prepared in separate beakers and then used in the suspension polymerization of the particles of this example, are described below.

1. Aqueous Phase

The aqueous phase used in the suspension polymerization of the particles of this example, as well as the procedure used to prepare the aqueous phase, are summarized in TABLE 1.

TABLE 1

The aqueous phase was prepared by adding Natrosol Plus 330 and gelatin (Bloom strength 250) to water, heating to 65° C. to disperse the Natrosol Plus 330 and the gelatin in the water, and then adding sodium nitrite and sodium carbonate. Its composition is listed below.

| INGREDIENT | WEIGHT (g) | % |
|---|---|---|
| Water | 1493.04 | 98.55 |
| Natrosol Plus 330 (hydroxyethylcellulose) | 7.03 | 0.46 |
| Gelatin (Bloom strength 250) | 3.51 | 0.23 |
| Sodium Nitrite (NaNO$_2$) | 4.39 | 0.29 |
| Sodium Carbonate (Na$_2$CO$_3$) | 7.03 | 0.46 |
| Total Weight in Grams | 1515.00 | 100.00 |

2. Organic Phase

The organic phase used in the suspension polymerization of the particles of this example, as well as the procedure used to prepare the organic phase, are summarized in TABLE 2.

TABLE 2

The organic phase was prepared by placing the monomers and benzoyl peroxide (an initiator) together and agitating the resulting mixture for 15 minutes. Its composition is listed below. After taking the other components of the 63% DVB mixture into account, the polymerizable monomer mixture actually consisted of roughly 68.73% S, 11.27% EVB and 20% DVB by weight. The total polymerizable monomer weight of was 1355.9 grams.

| INGREDIENT | WEIGHT (g) | % |
|---|---|---|
| Styrene (pure) | 931.90 | 67.51 |
| Divinylbenzene (63% DVB, 98.5% polymerizable monomers) | 430.44 | 31.18 |
| Benzoyl peroxide (75% active) | 18.089 | 1.31 |
| Total Weight in Grams | 1380.429 | 100.00 |

C. Preparation of Particles from Formulation

Once the formulation is prepared, its aqueous and organic phases are mixed, polymerization is performed, and "as-polymerized" and "heat-treated" particles are obtained, as described below.

1. Mixing

The aqueous phase was added to the reactor at 65° C. The organic phase was introduced 15 minutes later with agitation at the rate of 90 rpm. The mixture was held at 65° C. with stirring at the rate of 90 rpm for 11 minutes, by which time proper dispersion had taken place as manifested by the equilibration of the droplet size distribution.

2. Polymerization

Figure 4:
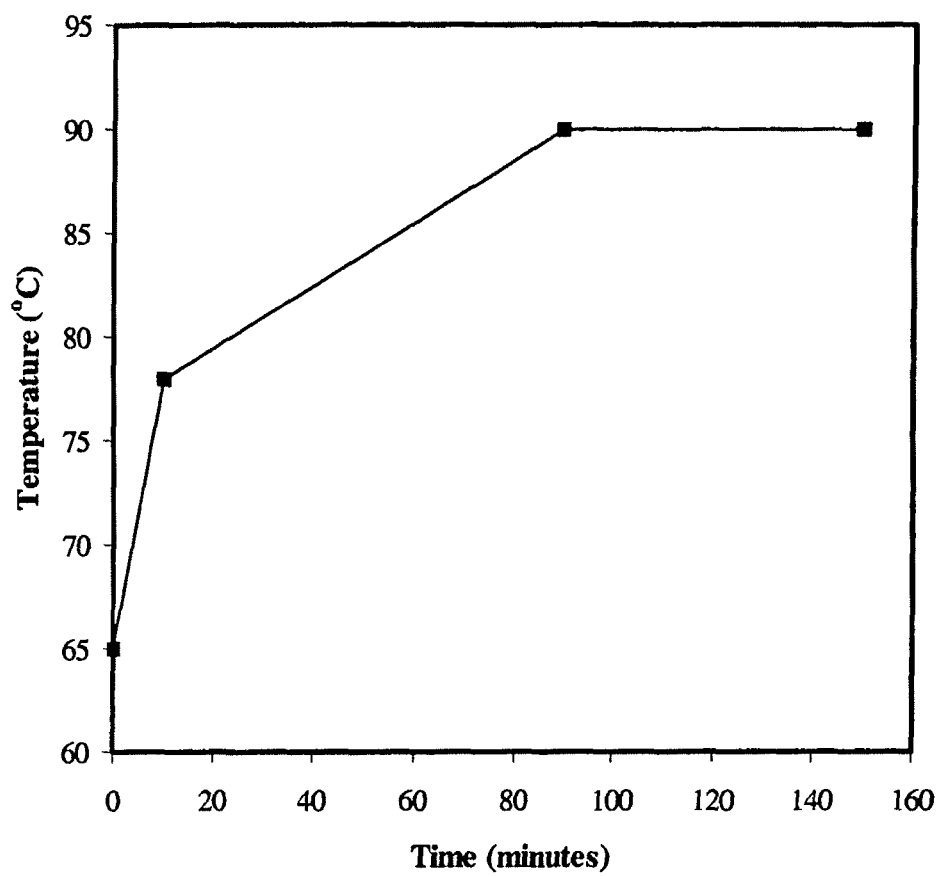
FIG. 4 shows the variation of the temperature with time during polymerization.

The temperature was ramped from 65° C. to 78° C. in 10 minutes. It was then further ramped from 78° C. to 90° C. very slowly over 80 minutes. It was then held at 90° C. for one hour to provide most of the conversion of monomer to polymer, with benzoyl peroxide (half life of one hour at 92° C.) as the initiator. The actual temperature was monitored throughout the process. The highest actual temperature measured during the process (with the set point at 90° C.) was 93° C. The thermoset polymer particles were thus obtained in an aqueous slurry which was then cooled to 40° C. FIG. 4 shows the variation of the temperature with time during polymerization.

3. "As-Polymerized" Particles

The "as-polymerized" sample obtained from the run of the pilot plant reactor described above will be designated as Sample AP. In order to complete the preparation of Sample AP, some of the aqueous slurry was poured onto a 60 mesh (250 micron) sieve to remove the aqueous reactor fluid as well as any undesirable small particles that may have formed during polymerization. The "as-polymerized" beads of larger than 250 micron diameter obtained in this manner were then washed three times with warm (40° C. to 50° C.) water and allowed to dry at ambient temperature. A small quantity from this sample was sent to Impact Analytical for DSC experiments.

Particles of 14/16 U.S. mesh size were isolated from Sample AP by some additional sieving. This is a very narrow size distribution, with the particle diameters ranging from 1.19 mm to 1.41 mm. This nearly monodisperse assembly of particles was sent to FracTech Laboratories for the measurement of the liquid conductivity of its packings.

After the completion of the liquid conductivity testing, the particles used in the packing that was exposed to the most extreme conditions of temperature and compressive stress were recovered and sent to Impact Analytical for DSC experiments probing the effects of the conditions used during the conductivity experiments on the thermal properties of the particles.

4. "Heat-Treated" Particles Postcured in Nitrogen

The as-polymerized particles were removed from some of the slurry. These particles were then poured onto a 60 mesh (250 micron) sieve to remove the aqueous reactor fluid as well as any undesirable small particles that may have formed during polymerization. The "as-polymerized" beads of larger than 250 micron diameter obtained in this manner were then washed three times with warm (40° C. to 50° C.) water, spread very thin on a tray, and heat-treated isothermally for twenty minutes at 170° C. in an oven in an inert gas environment (nitrogen). The heat-treated particles that were obtained by using this procedure will be designated as Sample IA20mG170C. A small quantity from this sample was sent to Impact Analytical for DSC experiments.

Particles of 14/16 U.S. mesh size were isolated from Sample IA20mG170C by some additional sieving. This is a very narrow size distribution, with the particle diameters ranging from 1.19 mm to 1.41 mm. This nearly monodisperse assembly of particles was sent to FracTech Laboratories for the measurement of the liquid conductivity of its packings.

After the completion of the liquid conductivity testing, the particles used in the packing that was exposed to the most extreme conditions of temperature and compressive stress were recovered and sent to Impact Analytical for DSC experiments probing the effects of the conditions used during the conductivity experiments on the thermal properties of the particles.

D. Differential Scanning Calorimetry

DSC experiments (ASTM E1356-03) were carried out by using a TA Instruments Q100 DSC with nitrogen flow of 50 mL/min through the sample compartment. Roughly eight to ten milligrams of each sample were weighed into an aluminum sample pan, the lid was crimped onto the pan, and the sample was then placed in the DSC instrument. The sample was then scanned from 5° C. to 225° C. at a rate of 10° C. per minute. The instrument calibration was checked with NIST SRM 2232 indium. Data analysis was performed by using the TA Universal Analysis V4.1 software.

Figure 5:
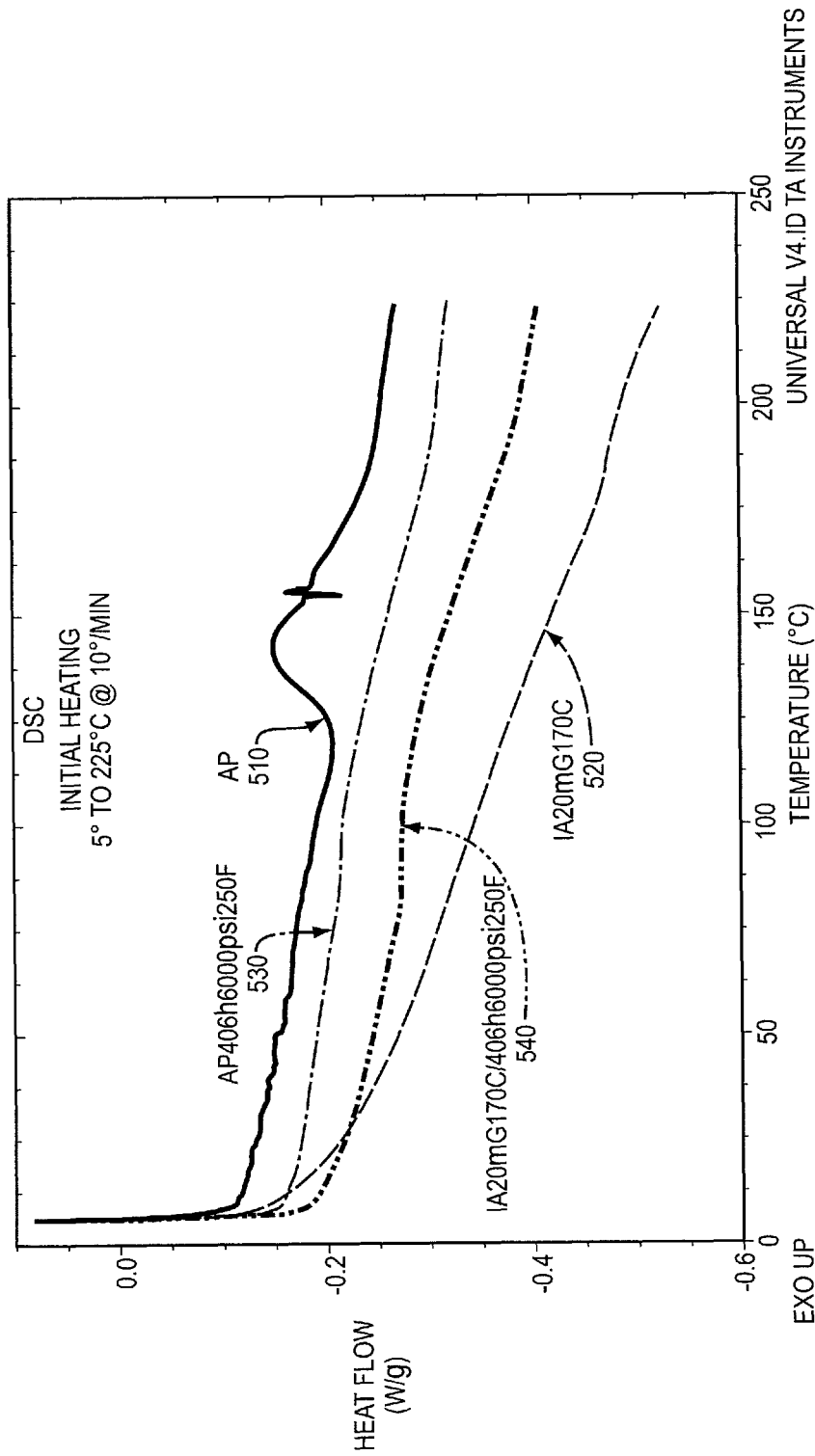
FIG. 5 shows the results of differential scanning calorimetry (DSC) scans. Sample AP manifests a large exothermic curing peak region instead of a glass transition region when it is heated. Sample AP is, hence, partially (and in fact only quite poorly) cured. On the other hand, while the DSC curve of Sample IA20mG170C is too featureless for the software to extract a precise glass transition temperature from it, there is no sign of an exothermic peak. Sample IA20mG170C is, hence, very well-cured. The DSC curves of Sample AP/406h6000psi and Sample IA20mG170C/406h6000psi, which were obtained by exposing Sample AP and Sample IA20mG170C, respectively, to 406 hours of heat at a temperature of 250° F. under a compressive stress of 6000 psi during the liquid conductivity experiments, are also shown. Note that the exothermic peak is missing in the DSC curve of Sample AP/406h6000psi, demonstrating that "in situ" post-curing via heat treatment under conditions simulating a downhole environment has been achieved.

The DSC data are shown in FIG. 5. Sample AP manifests a large exothermic curing peak region 510 instead of a glass transition region when it is heated. Sample AP is, hence, partially (and in fact only quite poorly) cured. On the other hand, while the DSC curve of Sample IA20mG170C 520 is too featureless for the software to extract a precise glass transition temperature from it, there is no sign of an exothermic peak. Sample IA20mG170C is, hence, very well-cured. The DSC curves of Sample AP/406h6000psi 530 and Sample IA20mG170C/406h6000psi 540, which were obtained by exposing Sample AP and Sample IA20mG170C, respectively, to 406 hours of heat at a temperature of 250° F. under a compressive stress of 6000 psi during the liquid conductivity experiments described below, are also shown. Note that the exothermic peak is missing in the DSC curve of Sample AP/406h6000psi, demonstrating that "in situ" postcuring via heat treatment under conditions simulating a downhole environment has been achieved. For the purposes of this application the term "substantially cured" means the absence of an exothermic curing peak in the DSC plot.

E. Liquid Conductivity Measurement

Figure 6:
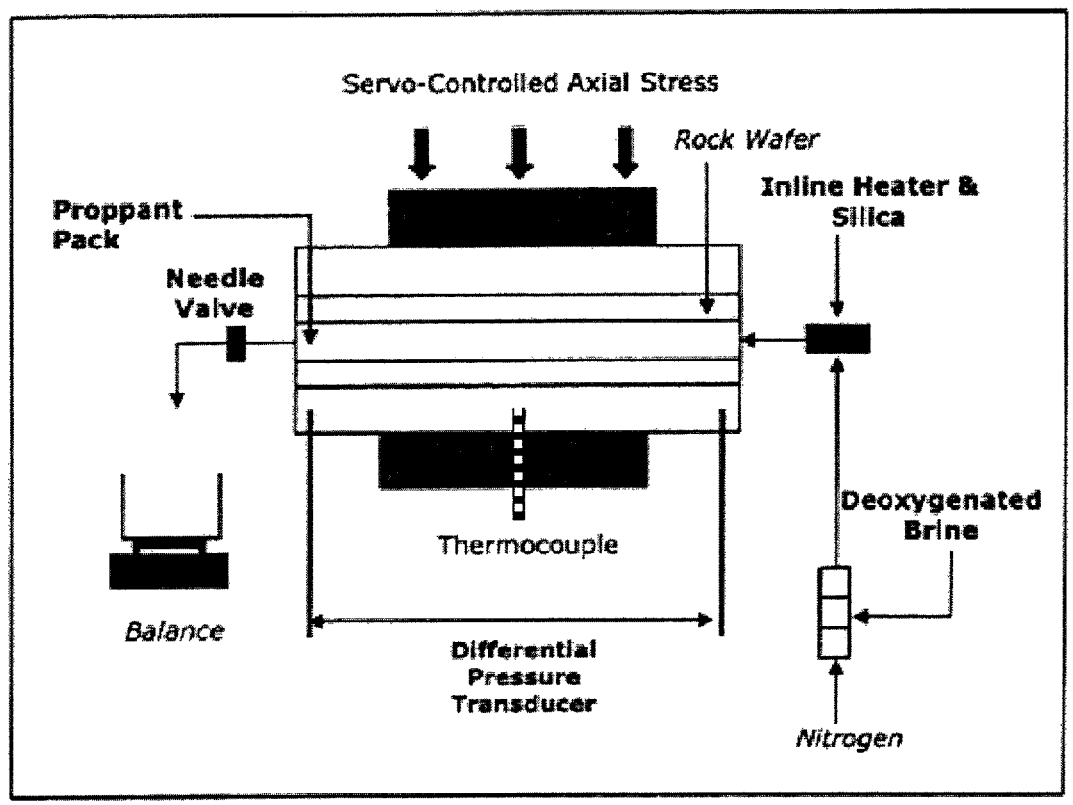
FIG. 6 provides a schematic illustration of the configuration of the conductivity cell.

A fracture conductivity cell allows a particle packing to be subjected to desired combinations of compressive stress (simulating the closure stress on a fracture in a downhole environment) and elevated temperature over extended durations, while the flow of a fluid through the packing is measured. The flow capacity can be determined from differential pressure measurements. The experimental setup is illustrated in FIG. 6.

Ohio sandstone, which has roughly a compressive elastic modulus of 4 Mpsi and a permeability of 0.1 mD, was used as a representative type of outcrop rock. Wafers of thickness 9.5 mm were machined to 0.05 mm precision and one rock was placed in the cell. The sample was split to ensure that a representative sample is achieved in terms of its particle size distribution and then weighed. The particles were placed in the cell and leveled. The top rock was then inserted. Heated steel platens were used to provide the correct temperature simulation for the test. A thermocouple inserted in the middle port of the cell wall recorded the temperature of the pack. The packings were brought up to the targeted temperature gradually and equilibrated at that temperature. Consequently, many hours of exposure to elevated temperatures had already taken place by the inception of the collection of conductivity data points, with the time at which the fully equilibrated cells were obtained being taken as the time=zero reference. A servo-controlled loading ram provided the closure stress. The conductivity of deoxygenated silica-saturated 2% potassium chloride (KCl) brine of pH 7 through the pack was measured.

The conductivity measurements were performed by using the following procedure:
1. A 70 mbar full range differential pressure transducer was activated by closing the bypass valve and opening the low pressure line valve.
2. When the differential pressure appeared to be stable, a tared volumetric cylinder was placed at the outlet and a stopwatch was started.
3. The output of the differential pressure transducer was fed to a data logger 5-digit resolution multimeter which logs the output every second during the measurement.
4. Fluid was collected for 5 to 10 minutes, after which time the flow rate was determined by weighing the collected effluent. The mean value of the differential pressure was retrieved from the multimeter together with the peak high and low values. If the difference between the high and low values was greater than the 5% of the mean, the data point was disregarded.
5. The temperature was recorded from the inline thermocouple at the start and at the end of the flow test period. If the temperature variation was greater than 0.5° C., the test was disregarded. The viscosity of the fluid was obtained from the measured temperature by using viscosity tables. No pressure correction is made for brine at 100 psi. The density of brine at elevated temperature was obtained from these tables.
6. At least three permeability determinations were made at each stage. The standard deviation of the determined permeabilities was required to be less than 1% of the mean value for the test sequence to be considered acceptable.
7. At the end of the permeability testing, the widths of each of the four corners of the cell were determined to 0.01 mm resolution by using vernier calipers.

The test results are summarized in TABLE 3.

TABLE 3

Measurements on packings of 14/16 U.S. mesh size of Sample AP and Sample IA20mG170C at a coverage of 0.02 lb/ft$^2$. The conductivity of deoxygenated silica-saturated 2% potassium chloride (KCl) brine of pH 7 through each sample was measured at a temperature (T) of 190° F. (87.8° C.) under a compressive stress ($\square_c$) of 4000 psi (27.579 MPa), at a temperature of 220° F. (104.4° C.) under a compressive stress of 5000 psi (34.474 MPa), and at a temperature of 250° F. (121.1° C.) under a compressive stress of 6000 psi (41.369 MPa). The time (t) is in hours. The liquid conductivity (J) is in mDft.

| T = 220° F., $\square_c$ = 5000 psi | | | T = 250° F., $\square_c$ = 6000 psi | | |
|---|---|---|---|---|---|
| t | J of AP | J of IA20mG170C | t | J of AP | J of IA20mG170C |
| 29 | 558 | 669 | 22 | 232 | 225 |
| 61 | 523 | 640 | 46 | 212 | 199 |
| 113 | 489 | 584 | 70 | 198 | 187 |
| 162 | 468 | 562 | 118 | 154 | 176 |
| 213 | 455 | 540 | 182 | 142 | 159 |
| 259 | 444 | 527 | 230 | 137 | 147 |
| 325 | 418 | 501 | 264 | 135 | 145 |
| 407 | 390 | 477 | 326 | 128 | 145 |
| | | | 357 | 122 | 139 |
| | | | 379 | 120 | 139 |
| | | | 406 | 118 | 137 |

Figure 7:
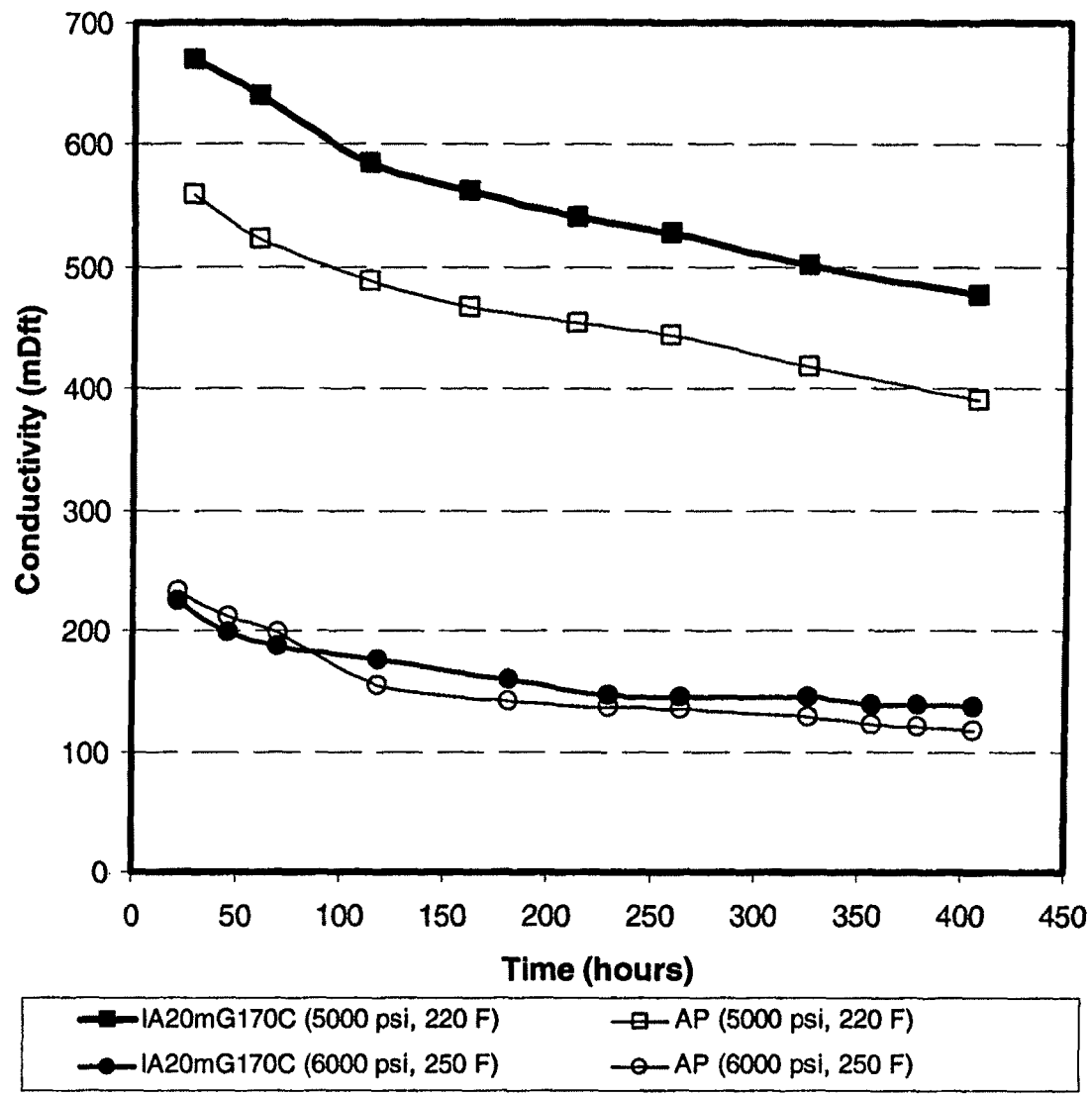
FIG. 7 compares the measured liquid conductivities of packings of particles of 14/16 U.S. mesh size (diameters ranging from 1.19 mm to 1.41 mm) from Sample IA20mG170C and Sample AP, at a coverage of 0.02 lb/ft², under a closure stress of 5000 psi at a temperature of 220° F., and under a closure stress of 6000 psi at a temperature of 250° F., as functions of the time.

These results are shown in FIG. 7.

The liquid conductivity of the partial monolayer of the heat-treated particles under a closure stress of 5000 psi at a temperature of 220° F. is seen to be distinctly higher than that of the partial monolayer of the "as polymerized" particles that were postcured via "in situ" heat treatment in the conductivity cell at a temperature of only 220° F.

It is also seen that partial monolayers of both particles that were heat-treated in a discrete additional post-polymerization process step and "as polymerized" particles that were kept for a prolonged period in the elevated temperature environment of the conductivity cell manifest useful levels of liquid conductivity (above 100 mDft) even under a closure stress of 6000 psi at a temperature of 250° F. The difference in liquid conductivity between the partial monolayers of these two types of particles is very small under a closure stress of 6000 psi at a temperature of 250° F., where long-term exposure to this rather high temperature is highly effective in advancing the postcuring of the "as polymerized" particles via "in situ" heat treatment as was shown in FIG. 5.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A method for lightening a load of cement comprising:
   mixing an uncured cement composition with an effective amount of a particle comprising a rigid thermoset polymer, wherein the thermoset polymer comprises a styrene-ethylvinylbenzene-divinylbenzene terpolymer; and
   placing the mixture in a selected location.

2. The method of claim 1, wherein said thermoset polymer has a substantially cured polymer network, wherein a packing of said particles manifests a static conductivity of at least 100 mDft after 200 hours at temperatures greater than 80° F.

3. The method of claim 1, wherein said particle has a shape; selected from the group of shapes consisting of a powder, a pellet, a grain, a seed, a short fiber, a rod, a cylinder, a platelet, a bead, a spheroid, or mixtures thereof.

4. The method of claim 1, wherein a largest principal axis dimension of said particle does not exceed 10 millimeters.

5. The method of claim 1, wherein said particle is a spherical bead having a diameter that does not exceed 10 millimeters.

6. The method of claim 1, wherein said diameter ranges from 0.1 mm to 4 mm.

7. The method of claim 1, wherein said polymeric particle is blended with other solid particles including at least one of sand, resin-coated sand, ceramic and resin-coated ceramic.

* * * * *